United States Patent [19]

Stucke et al.

[11] 4,451,413

[45] May 29, 1984

[54] JACKETING STEEL TUBES AND PIPES

[75] Inventors: Walter Stucke, Ratingen; Karl-Heinz Glissmann, Essen, both of Fed. Rep. of Germany

[73] Assignee: Mannesmann AG, Duesseldorf, Fed. Rep. of Germany

[21] Appl. No.: 328,134

[22] Filed: Dec. 7, 1981

[30] Foreign Application Priority Data

Dec. 12, 1980 [DE] Fed. Rep. of Germany ....... 3047429

[51] Int. Cl.$^3$ ............................................... B29H 5/26
[52] U.S. Cl. .................................. 264/26; 156/244.13; 156/244.17; 156/244.23; 264/173; 425/133.1
[58] Field of Search ............... 264/26, 173; 425/133.1; 156/244.13, 244.17, 244.23

[56] References Cited

U.S. PATENT DOCUMENTS

| | | | |
|---|---|---|---|
| 3,561,493 | 2/1971 | Maillard | 264/173 |
| 3,895,085 | 7/1975 | Suzuki et al. | 264/173 |
| 3,994,644 | 11/1976 | Hegler et al. | 264/173 |
| 4,101,699 | 7/1978 | Stine et al. | 264/173 |
| 4,144,111 | 3/1979 | Schaerer | 264/173 |
| 4,345,363 | 8/1982 | Leuchs et al. | 264/173 |

FOREIGN PATENT DOCUMENTS 1957078 5/1971 Fed. Rep. of Germany .

OTHER PUBLICATIONS

Basf Instruction Sheet For Lupolen A2910MX of Mar. 1977.

*Primary Examiner*—Donald E. Czaja
*Assistant Examiner*—W. Thompson
*Attorney, Agent, or Firm*—Ralf H. Siegemund

[57] ABSTRACT

A steel pipe is jacketed by concurrent extrusion of an ethylene hose concentric with a copolymer hose serving as an adhesive, the pipe passing through the extruder heat at an approximately 10% higher speed. The copolymer is predried, and the pipe is preferably precoated with heat-curable phenol or epoxy.

4 Claims, No Drawings

JACKETING STEEL TUBES AND PIPES

BACKGROUND OF THE INVENTION

The present invention relates to jacketing of steel tubes and pipes by means of a thermoplastic synthetic, such as polyethylene.

German printed patent application 19 57 078 discloses a dual-extrusion head by means of which a first hose of polyethylene is extruded, concentric with and circumscribing a second hose of a copolymer of ethylene which is to serve as an adhesive. These two hoses are extruded onto a heated steel tube which pases through the head for that purpose. The concurring extrusion processes may encounter different flow resistances so that the two hoses do not adhere to each other adequately. Accordingly, this particular publication proposes the use of rings in the annular nozzle channels of the extruder head, which rings are excentrically adjustable for purposes of balancing the flow resistances.

It has been observed that in some cases the force of adhesion (i.e., the resistance to peeling off the jacket being bonded to the tube by the copolymer of ethylene) is rather nonuniform so that overall adhesion is quite inadequate. Investigations of this particular problem have traced its cause to unfavorable atmpospheric and climatic conditions since it affects the copolymer adhesive which includes acrylic acid and acrylic acid ester. The copolymer granulate is stored prior to use, and, in the case of variable temperatures and high humidity, water may condense on the granules which reacts chemically with the copolymer of ethylene in a rather undesirable fashion, resulting in a reduction of its adhesive strength.

In order to avoid the problem above, it has been suggested to dry the copolymer granules prior to extrusion See, for example, BASF instruction sheet for Lupolen A 2910 MX of March 1977. Through private communication the supplier advised that this predying process may last for approximately two hours at 50° C. Resistance to peeling (peel strength) is, indeed, improved by this preparatory step; but in relation to the rather large periphery of steel pipes, there still remains some lack in uniformity.

DESCRIPTION OF THE INVENTION

It is an object of the present invention to improve adhesion of a thermoplastic jacket to a steel pipe and to improve, in particular, the peel strength of such a jacket when bonded to a steelpipe by means of the copolymer of an ethylene.

It is a feature of the present invention to achieve the stated object by avoiding chemical decomposition in the head through reducing the residence time of the material in the annular channel of the extrusion head and/or reducing the exposure of the material to the high head temperature. Further features of the invention relate to attempts of achieving a more uniform flow of the copolymer as it emerges from the annular channel. For economic reasons, the thickness of the copolymer layer is to be reduced, but without causing a reduction in its peel strength.

It is, therefore, a particular object of the present invention to improve the jacketing of steel pipes under utilization of a dual nozzle extrusion device for a thermoplastic as jacket material and an inner hose of a copolymer of ethylene as adhesive.

In accordance with the preferred embodiment of the invention, it is suggested to predry the granulated copolymer at a temperature not exceeding 70° C. for one hour and to extrude the thermoplastic, preferably polyethylene, and the copolymer at equal speeds while, preferably, the pipe speed is approximately 10% higher. The flow speed of the extrusion should be higher for a higher temperature of the extrusion head and of the extrudate. The flow speed should at least be 10 cm/sec for a head temperature of 170° C. and at least 5 cm/sec. for a head temperature of approximately 140° C. Moreover, pipes of smaller diameters (e.g., 100 mm) should be jacketed at higher extrusion flow speeds and higher extrudate and heat temperature; pipes of larger diameters (e.g., 500 mm) should be jacketed at respective lower values.

It is further preferred to precoat the steel pipe with a hot curing thermosetting resin, such as a phenol resin or an epoxi resin, the pipe is to be heated for that purpose, preferably inductively, to approximately 100° C. prior to coating and, additionally, after jacketing to approximately 200° C.

DESCRIPTION OF AN EXAMPLE OF THE PREFERRED EMBODIMENT

The invention will be explained more fully with reference to the jacketing of a steel pipe, having an outer diameter of 150 mm. The jacket is to be comprised of polyethylene, and the adhesive is to be an ethylene copolymer of acrylate. The jacketing is to be carried out in a dual nozzle extruder of the type disclosed in the aboveidentified patent. However, dual nozzle extrusion heads for jacketing tubing are well known, and the invention can be practiced with other such heads as well.

The raw material of interest is granulated polyethylene fed to the outer duct system of the dual nozzle extruder by means of second or extruders. The adhesive is the above-defined copolymer of ethylene and acrylate, this being an ethylene copolymer that contains acrylic acid and acrylic acid ester. This copolymer is provided in a granulated state and is heated in dry air in a stationary, fully automated drier, the air having a dew point of below −30° C. The drying is carried out for an hour at a temperature of 70° C.

This predried product is fed to the first-mentioned extruder whose barrel and screw feed the inner one of the two nozzles. This extruder is operated under exclusion of air and at a temperature of 160° C. to 170° C.

The head may be operated at 170° C., and the rate of feeding is adjusted to an extent that both extruded materials (concentric hoses) leave the nozzles at the same speed of 25 cm/sec. Moreover, the steel pipe to be jacketed passes through the head at a speed of 27.5 cm/sec.

It has been found that the resulting jacket has a peel strength, relative to the circumference of the pipe, of 10–12 kiloponds per centimeter. The adhesive layer has a thickness of 200 μm, which is less than th e usual 250 μm. This layer thickness of the adhesive can even be reduced further if, prior to jacketing, the pipe surface is coated with a hot, curable epoxy at a thickness of approximately 50 μm to 80 μm. In this particular case, one should inductively heat the steel pipe as shown, for instance, in German Pat. No. 22 57 135. In particular, the pipe is heated to approximately 100° C. prior to coating with epoxy and after jacketing the pipe is heated to 200° C.

It has been found that, as an additional advantage, the particular nozzle and annular channel for the copolymer (adhesive) is no longer subjected to the usual corrosion; presumably, this is the result of the speed equalization of jacket material and adhesive.

The invention is not limited to the embodiments described above; but all changes and modifications thereof, not constituting departures from the spirit and scope of the invention, are intended to be included.

We claim:

1. A method of jacketing a steel pipe by means of a dual nozzle extruding device, wherein an inner hose is extruded of a granulated ethylene copolymer to act as an adhesive, and an outer hose of a thermoplastic is extruded as the jacket proper, the improvement comprising said copolymer including acrylic acid and acrylic acid ester pre-drying the copolymer in air having a dew point below $-30°$ C. at a temperature of about 70° C. and for approximately one hour the thermoplastic and the copolymer, being extruded at the same speed at a temperature between 140° C. and 170° C., the speed being selected to be the higher, the higher the temperature of the thermoplastic and the copolymer in the dual nozzle head, accordingly the speed being at least 5 cm/sec. for a 140° C. head temperature, and at least 10 cm/sec. for a 175° C. head temperature.

2. The method as in claim 1, wherein the speed of the pipe being jacketed is 10% above said flow speed.

3. The method as in claim 1, and including the step of coating the pipe, prior to jacketing, with a thermosetting resin, heating the pipe prior to jacketing same to above 100° C. and subsequent to jacketing to approximately 200° C.

4. The method as in claim 3, said heating being carried out inductively.

* * * * *